United States Patent [19]

Snitchler

[11] Patent Number: 5,435,891
[45] Date of Patent: Jul. 25, 1995

[54] HOME WATER DISTILLATION APPARATUS

[76] Inventor: William H. Snitchler, 5648 S. 1150 West, Ogden, Utah 84405

[21] Appl. No.: 69,441

[22] Filed: Jun. 1, 1993

[51] Int. Cl.6 .............. B01D 3/02; C02F 1/04
[52] U.S. Cl. ................... 202/180; 203/10; 203/100; 202/195; 202/234; 202/237
[58] Field of Search ........ 202/195, 180, 185.2, 202/237, 234, 176; 203/1, 10, 100; 392/401

[56] References Cited

U.S. PATENT DOCUMENTS

| | | | |
|---|---|---|---|
| 3,830,705 | 8/1974 | Dewegeli | 202/189 |
| 3,980,526 | 9/1976 | Kirschmann | 202/83 |
| 4,194,950 | 3/1980 | Zalles | 203/10 |
| 4,261,796 | 4/1981 | Lemoine | 202/176 |
| 4,622,102 | 11/1986 | Diebel | 202/185.3 |
| 4,715,193 | 4/1990 | Chou | 203/10 |
| 4,906,337 | 3/1990 | Palmer | 203/10 |
| 4,943,353 | 7/1990 | Shannon | 202/181 |
| 4,946,558 | 8/1990 | Salmon | 202/176 |
| 5,110,418 | 5/1992 | Garrison et al. | 202/181 |
| 5,178,734 | 1/1993 | Palmer | 202/176 |
| 5,217,580 | 6/1993 | Chen | 203/10 |

Primary Examiner—Virginia Manoharan
Attorney, Agent, or Firm—A. Ray Osburn

[57] ABSTRACT

A home water distillation device for converting tap water to distilled water largely free of dissolved minerals and gases. A tubular shaped boiler with an electrical heating unit provides steam to a condensation coil immersed in an open top reservoir into which tap water is admitted under the control of a standard metering valve. The unit utilizes condensation heat to drive off chlorine and the like into the atmosphere, so that the steam is free of dissolved gases and the distillate product is corresponding free and therefore of increased palatability.

4 Claims, 2 Drawing Sheets

HOME WATER DISTILLATION APPARATUS

BACKGROUND OF THE INVENTION

1. FIELD

This invention relates to water distillers for use primarily in the home.

2. STATE OF THE ART

The advantages of distilled water are well known. Local water supplies often contain considerable amounts of minerals and metals in solution. Untreated hard water usually contains concentrations of calcium or magnesium salts at objectionable levels. Some times iron is present, which can give water an objectionable taste and color. Soft water contains, among other things, ions of sodium and sulphur. Bacteria or other living organisms may be present in drinking water, with well known deleterious effects. Distilled water on the other hand is substantially mineral and germ free. If properly distilled, it can also be free of chlorine and other antibacterial dissolved gaseous agents, Many water distillation systems intended for home use are known in the prior art. In various forms, most comprise a chamber containing the raw undistilled water, wherein it is heated to produce steam. The steam is generally then transmitted through tubing to condensing coils in a coolant liquid containing chamber. The coolant is generally cold undistilled water. The condensed distilled water is collected as it flows from the end of the condensing tube. In almost all the prior art devices, the heating is in a closed chamber, the steam generated being somewhat pressurized to cause it to flow through the condensation tubing and coil. This causes the volatile gaseous components of the raw water to flow along with the steam and become re-entrained into the finally distilled water. This substantially impairs the flavor of the distilled water.

The prior art devices are also characterized by considerable complexity. Control valves, float control devices and the like considered necessary by their inventors provide somewhat automatic operation, but only at the expense of increased maintenance problems and decreased reliability. Therefore, there remains a very clear need for a simple, easily maintained and easily operated home water distillation device.

BRIEF SUMMARY OF THE INVENTION

With the foregoing in mind, the disadvantages in prior home water distillation devices are eliminated or substantially alleviated by the present invention. The distillation device comprises an open top reservoir tank serving as both a supply source for raw undistilled water and as a condensing chamber with the water acting as a cooling agent. A steam producing chamber, called a boiler, is positioned with its bottom portion at generally the level of the reservoir, to which it is connected by an open horizontal boiler supply tube. Tap water is admitted into the reservoir via a hose controlled by a manually set needle valve. An electric heating element in the bottom of the boiler produces steam from the raw water. At a higher level, the steam exits the boiler through a steam tube via a tubular condensation coil submerged in the water in the reservoir. Condensed distilled water drains from the coil, which exits through the wall of the reservoir. Preferably, the boiler comprises connected tubular sections, including a lowermost horizontal leg receiving the raw water through the boiler supply tube from the reservoir, in which the water is boiled into steam by the heating unit. A vertical leg joins the lowermost leg, and is itself joined by an uppermost, substantially horizontal, leg. The uppermost leg slopes slightly upward, to drain any liquid water back to the lower part of the boiler. The vertical and uppermost legs provide a sizeable surge chamber for damping any sudden flash of steam from the heating unit. An open horizontal tube connects the vertical leg to the reservoir below the level of the water, maintaining equal pressure in the boiler and the tank.

The heat of condensation is utilized to preheat the water in the open top reservoir, increasing system efficiency. The preheating also drives dissolved gases from the water in the reservoir, to dissipate unnoticed into the atmosphere, rather than being re-absorbed into the condensing distilled water to mar its flavor and palatability. Adjustment of the reservoir inlet valve produces a small continuous overflow from the reservoir to prevent objectional mineral buildup. This assures that the water heated in the boiler does not become excessively charged with dissolved minerals to clog or impair the heater unit.

It is therefore the principal object of the invention to provide a greatly simplified home water distillation unit, economically built and easily maintained, and efficiently producing distilled water free of dissolved halogens and minerals.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
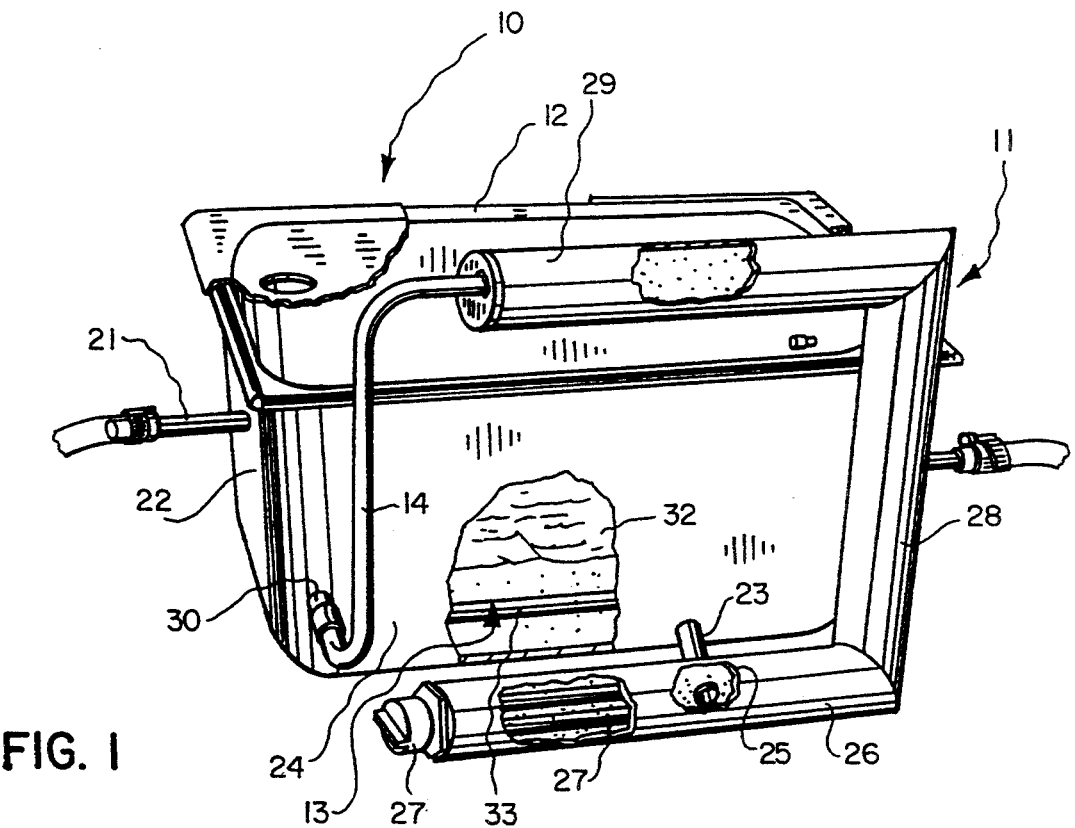
FIG. 1 is a perspective view of a home water distilling device in accordance with the invention, shown cut away in various areas to show internal construction details, and shown without an enclosing protective housing, drawn to a reduced scale, FIG. 2 a top plan view of the water distiller of FIG, 1, the housing however being shown as cut away to provide unobstructed view of the internal components of the device, drawn to the scale of FIG. 1, and FIG. 3 a right end view of the device of FIG. 1, with the housing cut away to reveal the internal components of the device, drawn to the scale of FIG. 2.
Figure 2:
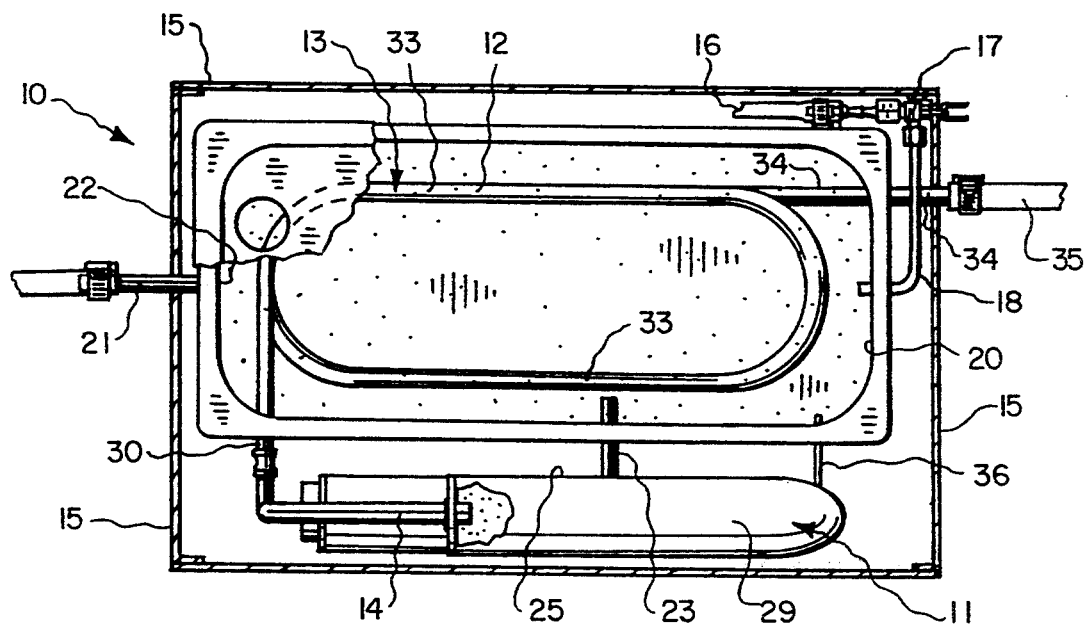
Figure 3:
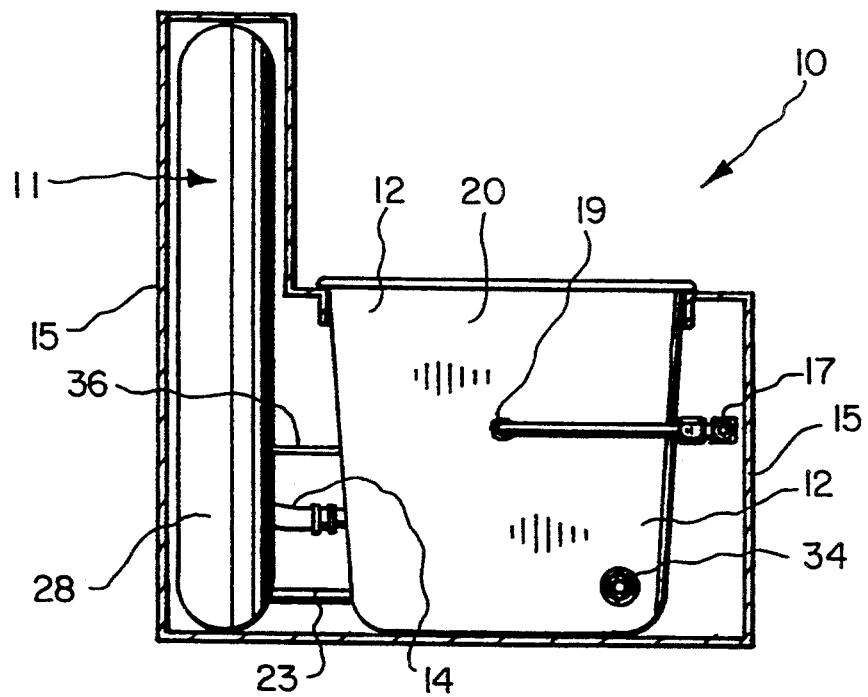

The home water distillation device 10 (FIG. 1) comprises a boiler assembly 11, an undistilled water reservoir tank 12 with a condensation coil 13 connected to boiler 11 by a steam outlet tube 14, all contained with an external housing 15, shown fragmentally in FIGS. 2 and 3. The housing 15 prevents harmful contact with the heated boiler 11 during operation, as well as providing a pleasing appearance.

A water supply hose 16 extends from a household water tap, not shown, to a water inlet control valve 17 of a common needle type installed upon a water inlet tube 18 secured as by brazing 19 through an end wall 20 of water reservoir tank 12. A tank overflow tube 21 extends through the other end wall 22 of tank 12. An open boiler water inlet tube 23 through side wall 24 extends also through wall 25 of a lowermost tubular leg 26 of boiler 11 housing an electrical heating unit 27.

Boiler 11 further comprises a vertical tubular leg 28 and an uppermost substantially horizontal tubular leg 29. The boiler steam outlet tube 14 connects upper boiler leg 29 with inlet tube portion 30 of the condenser coil 13 through tank wall 24. Condenser 13 is mounted in tank 12 submersed in a body 32 of undistilled water, which is admitted into reservoir tank 12 by way of water supply hose 16 controlled by needle valve 17. Condenser 13 comprises a tubular coil 33, ending in an outlet tube section 34 penetrating end wall 20 of tank 12, through which the condensed distilled water exits distiller 10. A collection hose 35 may be used to direct the distilled condensate to a receptacle, not shown, preferably of glass to preclude the presence of soluble impurities.

In operation, water entering boiler 11 through supply tube 23 is rapidly converted to steam because of the relatively small internal volume of lowermost boiler leg 26. The remaining vertical and upper horizontal legs 28 and 29 together provide sufficient internal boiler volume to dampen any pressure surges from rapid flashing of water into steam in lowermost leg 26. Although appearing horizontal in the drawings, upper leg 29 preferably slopes slightly upward from vertical leg 28. Because of vigorous boiling in lower leg 26, droplets of water not converted to steam are sometimes carried up to leg 29, to deposit on its walls. Thence, this still raw water drains back to be subsequently completely converted to steam. To prevent such droplets from entering condenser 31, the boiler end of tube 14 extends well into the interior of upper leg 29.

Additional buffering of pressure pulses is provided by an open pressure equalization tube 36 venting the inside volume of vertical leg 28 to the inside of tank 12 at an elevation below the surface of the body 32 of water. Tank 12 is vented by perforated cover 37 to the ambient atmosphere. Tube 36 is quite small ($\frac{1}{8}$" diameter, for example, in one working model) and provides only a small flow area, but nevertheless effectively precludes damage to the device 10 from any backflow past the heating unit 27 to tank 12 through supply tube 23.

During operation of distiller 10, the inflow of water to tank 12, the conversion of water to steam and the condensation of steam to distilled water all proceed continuously. All principal components of distiller 10 must be selected to act in complementary concert, and considerable experimentation has proven necessary to select combinations of component parameters for effective operation of the device 10. In one configuration, derived from extensive experimentation, comprises boiler tubes 27, 38, and 29 of 1½" diameter steel tubing with respective lengths of 7¾", 8½" and 6⅜", a ⅜" diameter boiler feed tube 23, a ⅛" diameter pressure equalization tube 36, a ¼" boiler outlet tube 14 and a condenser coil 13 of approximately one and one-half loops of ¼" tubing totaling approximately 36" of emersed length, along with a 1500 watt heating element 27. The distiller 10 with these parameters has produced about ½ gallon of distilled water per hour. Other combinations maybe deriveable experimentally to also operate satisfactorily. For greater or less distilled water capacity, all component parameters would require extensive further experimental selection and combination.

For best operation, the inflow of raw, cold tap water is carefully adjusted. Valve 17 is set to provide a small overflow through overflow tube 21, keeping the body of water at the desired level during normal variation in tap water pressure and flow rate. Also, the inflow-to-overflow ratio can be adjusted by valve 17 to control the temperature of the tank water 32 at the desired level, as it becomes heated in the condensation process. A desirable balance between low temperature for efficient condensation and somewhat higher temperature desirable to volatilize dissolved gases can be achieved. A corollary benefit of providing tank overflow is relief of increasing mineral concentration in tank 12. This slows mineral deposits upon heating assembly 27, extending the period of use before cleaning is necessary.

Other specific embodiments than the illustrated may be possible within the spirit of the invention. For example, the tubular configuration of boiler 11 could, with requisite experimentation, be replaced by a rectangular configuration. Other water supply flow control means, such as float controlled valves and the like could be employed, albeit at the expense of increased maintenance and decreased reliability.

The invention may be embodied in still other specific forms without departing from the spirit or essential characteristics thereof. The present embodiments are, therefore, to be considered as illustrative and not restrictive, the scope of the invention being indicated by the appended claims rather than by the foregoing description, and all changes that come within the meaning and range of equivalency of the claims are, therefore, intended to be embraced therein.

What is claimed and desired to be secured by United States Letters Patent is:

1. A water distillation apparatus, comprising;
   a top vented water reservoir tank comprising a bottom member and wall members upstanding therefrom;
   means for providing a body of undistilled water filling the tank to a predetermined level, said body of water having an uppermost and a lowermost portion
   a generally closed boiler chamber secured with a lowermost portion thereof below the elevation of the surface of the body of water contained in the tank, and an uppermost portion thereof at an elevation higher than that of said surface of water
   an electrical water heating assembly installed within the lowermost-portion of the boiler chamber
   open water flow passage means connecting the body of water in the tank to the lowermost portion of the boiler at an elevation no higher than that of the heating assembly;
   a steam condenser submersed in water in the tank, having a steam inlet and a condensate outlet respectively entering and exiting through wall members of the tanks;
   open steam passage means connecting the uppermost portion of the boiler chamber to the steam inlet of the condenser;
   open horizontal passage means venting the boiler chamber into the tank at an elevation below that of the surface of the body of water therein but above the water heating assembly; wherein
   the boiler comprises an elongate lowermost horizontal tubular portion containing the electrical water heating assembly, said lowermost portion being joined at one of its ends to the lowermost end of a vertical tubular portion, said vertical portion being connected at its uppermost end to an end of an uppermost horizontal tubular portion:
   the steam passage means connecting the condenser and the boiler chamber comprises a tube connected to the uppermost tubular portion of the boiler chamber;
   the open water flow passage means comprises an open tube through a wall the tank and a wall of the lowermost tubular portion of the boiler chamber; and the means venting the boiler chamber comprises an open tube through a wall of the tank and a wall of the vertical tubular portion of the boiler chamber at an elevation below the surface of the water in the tank.

2. The apparatus of claim 1, wherein:

the means for providing undistilled water comprises hose means connecting a water tap to a manually adjustable water flow metering valve mounted upon a tank water inlet tube through a wall of the tank and overflow means through a wall of the tank at a desired level of the body of water therein.

3. The apparatus of claim 1, wherein:

the tubular portions of the boiler are of a stock wall thickness and are $1\frac{1}{4}''$ in outside diameter, the lowermost, vertical and uppermost portions are respectively approximately $7\frac{3}{4}''$, $8\frac{1}{2}''$ and $6\frac{3}{8}''$ in length;

the heating assembly is of 1500 watt power;

the tube connecting the boiler chamber and the condenser is of $\frac{1}{2}''$ diameter stock;

the condenser comprises approximately 36" of tubing of $\frac{1}{2}''$ diameter stock, coiled within the tank beneath the water therein;

the open water flow passage tube is of $\frac{3}{8}''$ diameter stock; and the boiler chamber venting tube is of $\frac{1}{8}''$ diameter stock.

4. The apparatus of claim 3, wherein:

the means for providing undistilled water comprises hose means connecting a water tap to a manually adjustable water flow metering valve mounted upon a tank water inlet tube through a wall of the tank and overflow means through a wall of the tank at a desired level of the body of water therein.

* * * * *